United States Patent [19]
Tulkoff et al.

[11] Patent Number: 5,890,017
[45] Date of Patent: Mar. 30, 1999

[54] APPLICATION-INDEPENDENT AUDIO STREAM MIXER

[75] Inventors: Michael C. Tulkoff, Cedar Park; Ravinder P. Wadehra, Austin, both of Tex.

[73] Assignee: International Business Machines Corporation, Armonk, N.Y.

[21] Appl. No.: 753,084

[22] Filed: Nov. 20, 1996

[51] Int. Cl.⁶ .................................................. G06F 13/00
[52] U.S. Cl. .......................... 395/885; 395/888; 395/889; 395/680; 395/682; 395/200.33; 84/645
[58] Field of Search ................................ 395/885, 888, 395/889, 200.33, 680, 682, 200.61, 200.76, 200.77; 84/645

[56] References Cited

U.S. PATENT DOCUMENTS

| | | | |
|---|---|---|---|
| 5,054,360 | 10/1991 | Lisle et al. | 84/645 |
| 5,404,248 | 4/1995 | Shimoda et al. | 360/48 |
| 5,495,552 | 2/1996 | Sugiyama et al. | 395/2.1 |
| 5,515,107 | 5/1996 | Chiang et al. | 348/473 |
| 5,552,921 | 9/1996 | Hetzel et al. | 359/173 |
| 5,673,401 | 9/1997 | Volk et al. | 395/327 |
| 5,703,995 | 12/1997 | Willbanks | 386/52 |

*Primary Examiner*—Ayaz R. Sheikh
*Assistant Examiner*—Ario Etienne
*Attorney, Agent, or Firm*—Sawyer & Associates; Volel Emile

[57] ABSTRACT

Method and system aspects output a single audio stream from a plurality of audio streams provided by at least one application program running on a computer system with an audio device. Production of the single audio stream includes forming a server process in the computer system, emulating the audio device with the server process to allow any combination of audio stream formats, and manipulating the plurality of audio streams with the server process to form the single audio stream for maintaining transparency to the at least one application program.

28 Claims, 3 Drawing Sheets

APPLICATION-INDEPENDENT AUDIO STREAM MIXER

TECHNICAL FIELD

The present application is related to audio output in computer systems, and more particularly to mixing multiple audio streams to be output at one time from a computer system.

BACKGROUND

Many of today's desktop applications utilize audio output capabilities typically available on computer systems. While running on multitasking operating systems that allow users to operate many applications at the same time, desktop applications are usually restricted by typical audio hardware that only allows for the playback of one audio stream at one time. The user therefore is also restricted to implementing one audio application at a time.

Often, users desire output of more than one stream at a time. With many applications running, the multiple streams may be generated by any combination of the applications. Alternatively, a single application, such as a game application, may desire to output more than one audio stream at a time. For example, a game may include a background audio stream, while interjecting momentary reaction audio streams according to activity occurring during the playing of the game. Usually, for situations as in the game application, the application itself compensates for the audio hardware to produce the overlapping audio output.

Some attempts to provide audio stream mixing have tried to overcome the limitations imposed by the audio hardware. Unfortunately, these are still not completely satisfactory. For example, Microsoft Windows operating system allows the user to mix one stream of a WAV type file with one stream of a MIDI type file. However, WAV and MIDI streams are high-level file formats, and not all applications produce audio in such high-level file formats. Another example of product that includes a mixer is Java/Hot Java from Sun Microsystems, Inc. However, Java only allows Mu-Law streams to be mixed. Again, such restriction to a particular file format is unduly limiting for current computing environments. A third example is provided in U.S. Pat. No. 5,054,360 issued to Lisle, et al., and entitled "Method and Apparatus for Simultaneous Output of Digital Audio and MIDI Synthesized Speech". Unfortunately, as the title indicates, the Lisle et al. patent is also restricted to a particular file format by being limited to combining MIDI with digital audio speech.

Accordingly, what is needed is system that allows mixing of multiple audio streams from one or more applications at one time without differentiating between the actual audio formats of the streams and the file formats with which the audio is stored.

SUMMARY

The present invention meets these needs through method and system aspects. In a method aspect for outputting a single audio stream from a plurality of audio streams provided by at least one application program running on a computer system with an audio device, the method includes forming a server process in the computer system, and emulating the audio device with the server process to allow any combination of audio stream formats for maintaining transparency to the at least one application program. The method further includes manipulating the plurality of audio streams with the server process to form the single audio stream.

In another method aspect for providing a running process in a computer system that allows simultaneous use of an output audio device, the method includes sending a plurality of audio streams of varying formats from at least one application program running on the computer system to the output audio device. The method further includes intercepting the plurality of audio streams with a mixer daemon for maintaining transparency to the at least one application program. Additionally, the method includes filtering and combining the plurality of audio streams with the mixer daemon to form a single audio stream for output from the audio output device at one time.

In a system aspect, a system for producing a single audio stream from a plurality of audio streams of any audio format includes a computer system, the computer system supporting at least one application program, the at least one application program producing the plurality of the audio streams. The computer system includes an audio output device for outputting audio data from the computer system, and a mixer daemon, the mixer daemon filtering and combining the plurality of audio streams to produce the single audio stream output to the audio output device for maintaining transparency to the at least one application program.

Through these aspects of the present invention, multiple applications that use audio and/or a single application that requires multiple audio streams are capably utilized. The invention further allows multiple, independent audio streams to be played simultaneously without requiring the applications to know about each other, to add any special interface code, or to be recompiled. Additionally, flexibility is achieved as the applications are unrestricted in playing back audio streams with any frequency, channel width, sample width, or format independent of the other streams. These and other advantages of the aspects of the present invention will be more fully understood in conjunction with the following detailed description and accompanying drawings.

DETAILED DESCRIPTION

The illustrative embodiment relates to multiple audio stream mixing from one or more applications on a computer system. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
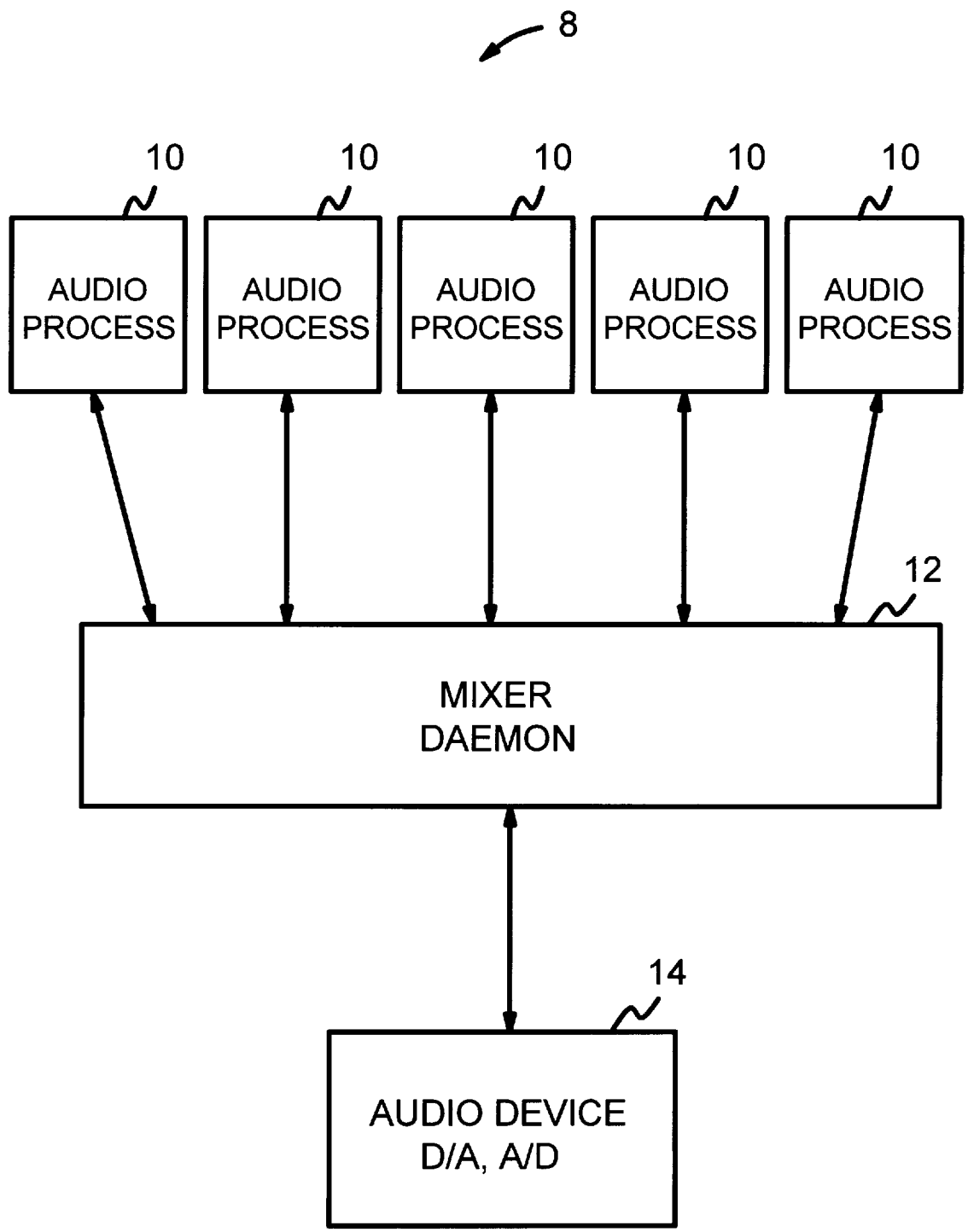
FIG. 1 illustrates an overall block diagram of interaction in a system for producing multiple audio stream output at a time in accordance with the present invention.

In general, the present invention creates a software audio mixer to digitally mix any number of independent audio streams from any number of applications and sends the new, mixed stream to an audio device. As shown in FIG. 1, included in a computer system 8 in accordance with the present invention are audio processes 10, representing sources of audio streams from one or more applications. Also included is a mixer daemon 12 for providing the software mixer in a server program. The audio processes 10 act as clients to the mixer daemon 12. A modified remote dispatch model is preferably used for the client/server (audio processes/mixer daemon) arrangement in order to accommodate maintenance of transparency to the applications and standardization of audio API (application programming interface). In a preferred embodiment, the client/server arrangement runs in an AIX or UNIX environment with communications consisting of Berkeley sockets. Of course, similar IPC in operating systems other than AIX could be substituted.

In operation, the mixer daemon 12 suitably waits on a select system call for client events. The mixer daemon 12 preferably keeps track of all of the clients, i.e., audio processes 10, that have made connections to it with internal client structures. The internal structures suitably contain all of the audio stream parameters that were set in each audio process 10, including sampling rate, volume, channels, bits per sample, audio format (e.g., PCM, Mu-Law, A-Law), etc., as is well appreciated by those skilled in the art.

In addition to the audio client structures, each audio stream is suitably stored in a designated local buffer as the audio stream is sent from an audio process 10 until the audio stream is removed, filtered, mixed, and written (played) to the audio device 14. Preferably, the local buffer emulates an audio buffer in an audio device driver of the audio device 14.

Figure 2:
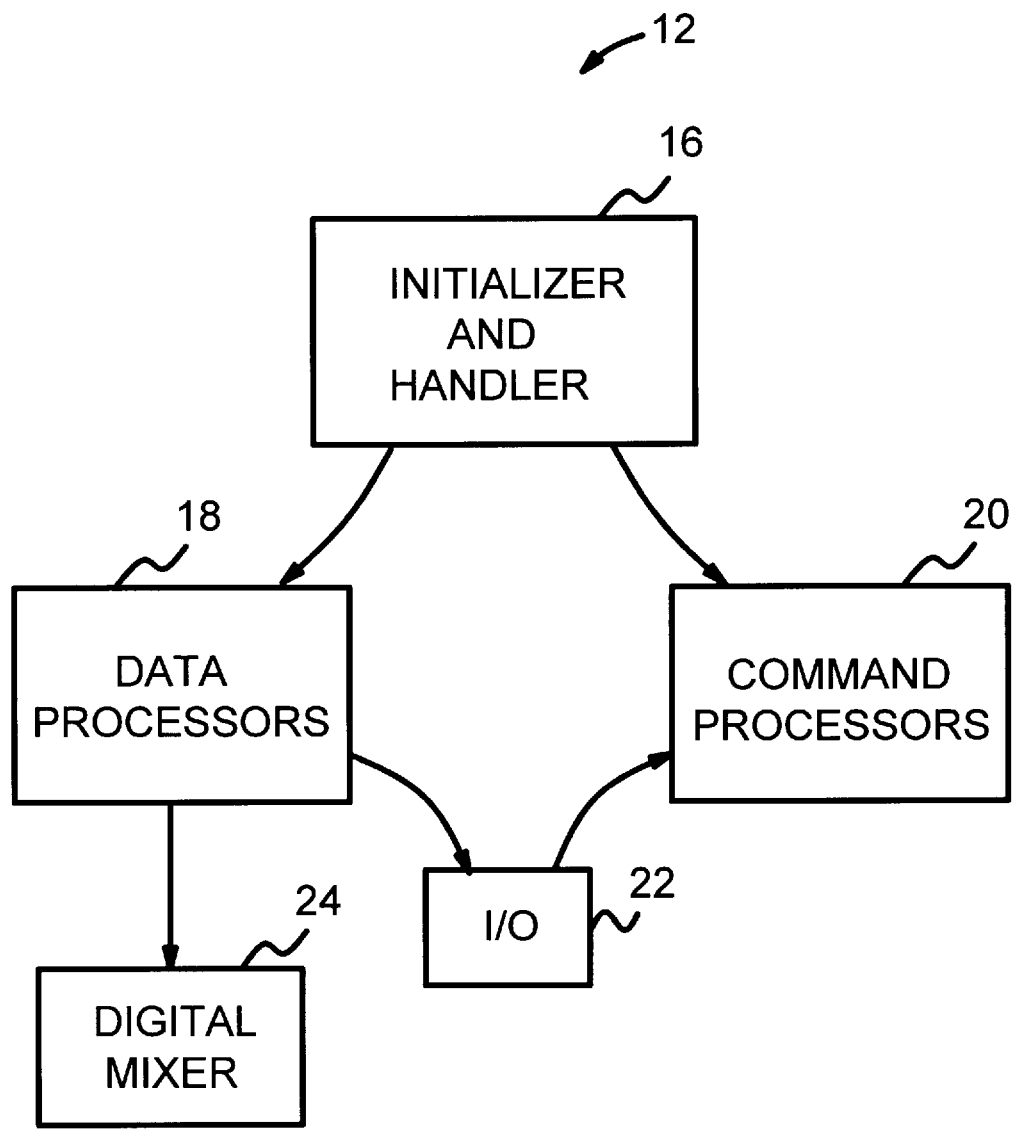
FIG. 2 illustrates a block diagram of a mixer daemon portion of FIG. 1 in greater detail.

As shown by FIG. 1, the interaction within the system proceeds with the interception of the audio streams being sent from the audio processes 10 to the audio device 14 by the mixer daemon 12 and being manipulated before forwarding to the audio device 14. The mixer daemon 12 suitably grabs control of the audio device 14 when the audio device 14 is started. The mixer daemon 12 preferably then acts to emulate all audio device 14 behavior, so that the audio processes 10 interact as though the mixer daemon 12 were the audio device 14. FIG. 2 illustrates a more detailed block diagram representation of the mixer daemon 12 for the interception and manipulation functions.

As shown in FIG. 2, a main section of mixer daemon 12 acts as an initializer and handler 16. Suitably, the initializer and handler 16 initializes the audio device 14 and the mixer daemon 12 while establishing a communication path. Further, the initializer and handler 16 preferably makes functions calls for data processors 18 and command processors 20, as well as providing an event handler.

The data processors 18 suitably perform functions that prepare audio data for output, including interpolation and conversion, in order to produce a common format to support combination to one audio stream in accordance with the present invention. Command processors 20 suitably process requests from clients and handle receiving commands from the client(s) and writing commands to the client(s). By way of example, the command processors 20 parse commands from the client, and process audio commands including: changing settings, reporting synchronization information to the client, writing data into and reading data from local buffers for the client, and emulating read/write buffer and time values. Transmissions between the data processors 18 and command processors 20 preferably occur through input/output (I/O) interface 22, as is well understood by those skilled in the art. Suitably, formation of a single audio stream results, as described in more detail with reference to FIG. 3, and is output from mixer daemon 12 via digital mixer 24.

Figure 3:
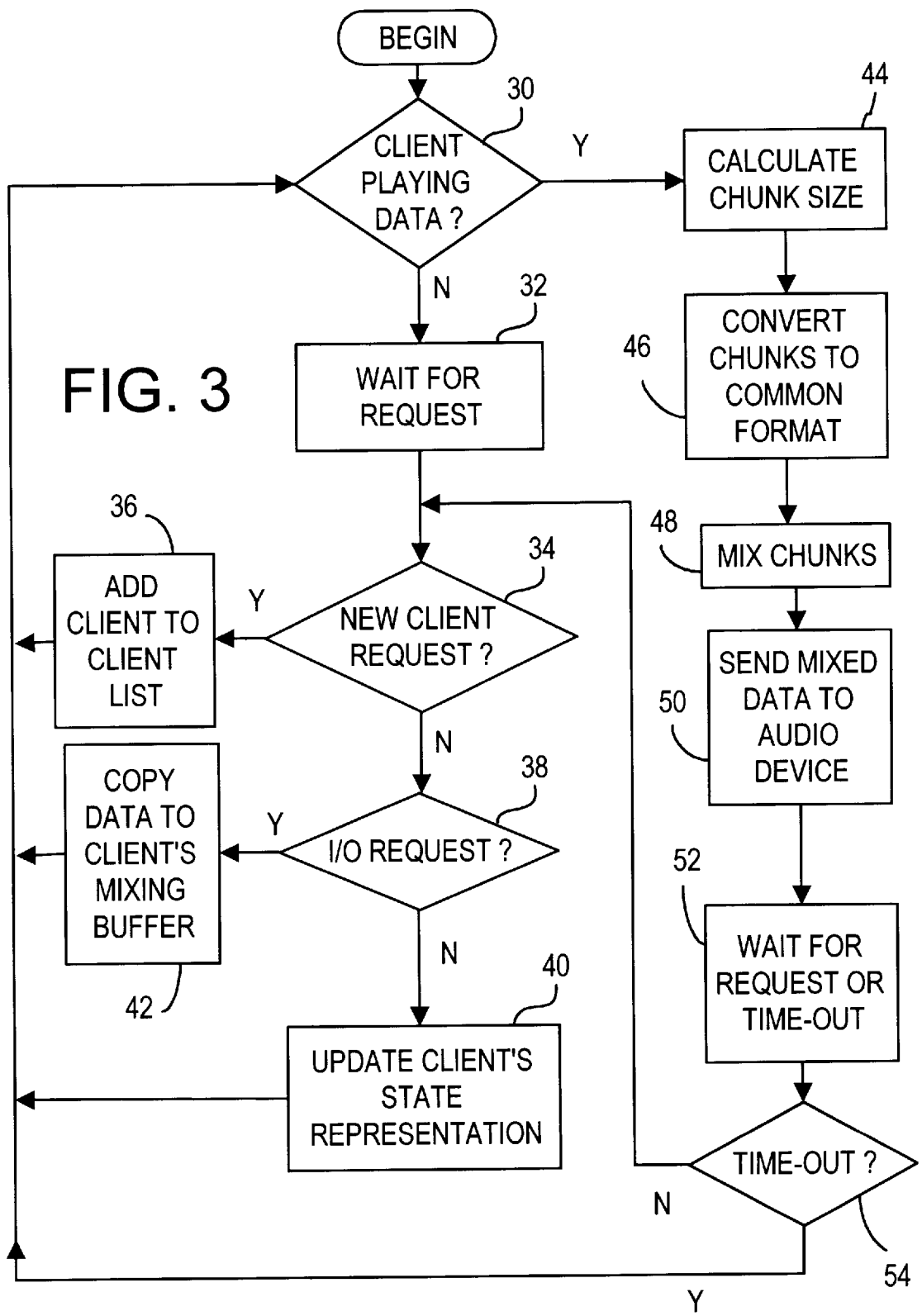
FIG. 3 illustrates a flow chart in correspondence with the block diagram of FIG. 2 in greater detail.

The flow chart of FIG. 3 illustrates more particularly the running loop process occurring in the mixer daemon 12 to produce a mixed single stream audio output in accordance with the present invention. The process suitably begins by determining whether any clients are currently playing audio data, i.e., whether there is any data in active buffers, where a buffer is active if a client is connected and has started playback, (step 30). If there are no clients currently playing audio data, the process continues by waiting for a request from a client (step 32), e.g., the issuance of a command, such as open, close, start, stop, write, etc., from a client. When a request is received, a determination of whether the request is from a new client is made (step 34). When the request is from a new client, the client is added to a list of clients being serviced by the mixer daemon 12 (step 36), and the process continues from step 30.

When the client is not a new client, a determination of whether the existing client is attempting to play data through an I/O request is made (step 38). When the request is not an I/O request, the request is handled by updating the client's state representation (step 40), such as to update a change in the sample rate, a change in the volume, etc. When the request is an I/O request and the client is trying to play data, the data being played is copied to a buffer allotted to the client in the mixer daemon 12 (step 42). After handling of the request in either step 40 or 42, the process continues by checking for a client playing data, i.e., from step 30.

Once a client is playing data, such that a client 10 has sent all of the audio commands to start playing a stream on an audio device 14 and step 30 is affirmative, the process of forming chunks of data to support the mixing in accordance with the present invention occurs. A chunk is suitably defined as a period of time in milliseconds. In general time is constant when dealing with audio data, while the amount of data associated with each stream over the same time period varies due to differing frequencies, sample widths, etc. In a preferred embodiment, the chunk size is variable with respect to time, instead of being a fixed length.

In breaking the data into chunks (step 44), a chunk size is suitably determined based on a time slice, e.g., 20–40 samples, of the data. The mixer daemon 12 suitably tracks the time in real-time and appropriately adjusts the chunk size for each pass through the loop. The mixer daemon 12 thus is able to calculate how much data has been consumed by the audio device 14 for any given client 10 and will report this information to the client 10 as part of synchronization. Preferably, each chunk has a maximum size equal to the time period selected by the mixer daemon 12. At times, a chunk may have less data with the individual buffers running out of data. The mixer daemon 12 suitably provides blank data to maintain the chunk size for such buffers.

Once the data is broken down into chunks, the chunks are suitably converted to a common format (step 46) via data processors 18 (FIG. 2). Since audio of different frequencies, formats, etc., cannot be mixed and played, one set of parameters is suitably chosen as a baseline for the differing audio streams being mixed and played. In a preferred embodiment, the baseline chosen is Pulse Code Modulation (PCM) stereo audio with 16 bit samples. The mixer daemon 12 thus suitably sets the actual audio device 14 to play audio with these parameters. The chunks from the individual buffers are then appropriately digitally filtered to each be PCM, 16 bit stereo, and at the same time are filtered to be the same frequency (sampling rate). The audio device 14 is also suitably set to play at this frequency.

Selection of the output frequency may be done in a number of ways. By way of example, in a preferred embodiment, the first frequency could be selected and used until the last stream becomes inactive again. Alternatively, a highest current frequency among active streams could be selected with synchronization of all other streams to that frequency, or the CD Stereo rate (44.1 KHz (kiloHertz)) is selected and used.

The converted chunks are then mixed together to create a single audio stream (step 48) via digital mixer 24 (FIG. 2). In forming the single audio stream, preferably the uniform chunks are fed into a subroutine. The subroutine suitably digitally combines the chunks with each chunk having an associated volume. In a preferred embodiment, the associated volume is turned into a floating point attenuation factor, i.e., a number between 0 and 1 inclusive. By way of example, if the volume is 100, the attenuation factor is one and the chunk is fully represented in the mix. Conversely, if the volume is zero, the attenuation factor is zero, and the chunk is factored out of the mix. Any volume value in between attenuates the signal and gives the chunk less representation in the mixed stream. All of the attenuated chunks are then suitably summed and returned from the subroutine as a single, uniform chunk suitable for sending to the audio device 14. Suitably, if there are numerous streams mixing at high volume, the audio will be clipped by the mixer a daemon 12 instead of being allowed to rise to infinity.

The mixed, single audio stream is then sent to the audio device (step 50), which converts the chunk into an analog signal that the user hears. The process then continues to wait for another request or the occurrence of a time-out (step 52). The inclusion of a time-out allows for the process to maintain real-time by continuing to mix and output stored audio samples at such a time where there are no client requests. When a time-out, e.g., a period of 125 milliseconds occurs, as determined via step 54, the process continues from step 30 to await a client request. When a client request does occur for continuing an audio stream, the process continues from step 34, as described above. Thus, the main loop repeats the process indefinitely and continues to produce audio chunks that are filtered, mixed, and played through the audio device.

With the emulation of the audio device 14 by the mixer daemon 12, the application(s) providing the audio streams interact unaware of any difference. Further, the present invention is truly application-independent and will not force any applications to recompile. Thus, future applications are readily capable of being incorporated with existing applications in the mixing scheme in accordance with the present invention. In addition, the present invention allows an arbitrary amount of audio streams to be combined and allows the application(s) to arbitrarily send any type of supported audio format with any set of parameters such as sampling rate, bits per sample, etc., for mixing and playing. Thus, a wide variety of formats including WAV audio, SND audio, MIDI audio, and raw formats such as PCM, Mu-Law, and A-Law, are readily supported and advantageously mixed in any combination.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for outputting a single audio stream from a plurality of audio streams provided by at least one application program running on a computer system with an audio device, the method comprising:

forming a server process in the computer system;

emulating the audio device with the server process to allow any combination of audio stream formats for maintaining transparency to the at least one application program; and manipulating the plurality of audio streams with the server process to form the single audio stream.

2. The method of claim 1 wherein the server process comprises a mixer daemon.

3. The method of claim 1 wherein the step of manipulating further comprises calculating a chunk size and forming a chunk of data for each of the plurality of audio streams, to facilitate mixing of the plurality of audio streams.

4. The method of claim 3 further comprising converting each chunk for each of the plurality of audio streams to a common format.

5. The method of claim 4 further comprising mixing the chunks together.

6. The method of claim 5 further comprising sending the mixed chunks to the audio device as the single audio stream.

7. The method of claim 3 further comprising varying the chunk size with respect to time.

8. The method of claim 3 further comprising determining the chunk size based on a time slice of the plurality of audio streams.

9. The method of claim 4 further comprising choosing a set of parameters as a baseline.

10. The method of claim 9 further comprising choosing the baseline as Pulse Code Modulation stereo audio with 16 bit samples.

11. The method of claim 9 further comprising filtering each chunk to be a common frequency.

12. The method of claim 11 wherein the common frequency further comprises a first frequency.

13. The method of claim 11 wherein the common frequency further comprises a highest frequency.

14. The method of claim 11 wherein the common frequency further comprises 44.1 KHz.

15. The method of claim 5 further comprising digitally combining the chunks and attenuating a volume associated with each chunk by an attenuation factor.

16. A method for providing a running process in a computer system that allows simultaneous use of an audio device, the method comprising:

sending a plurality of audio streams of varying formats from at least one application program running on the computer system to the output audio device;

intercepting the plurality of audio streams with a mixer daemon emulating the audio device for maintaining transparency to the at least one application program; and filtering and combining the plurality of audio streams with the mixer daemon to form a single audio stream for output from the audio output device at one time.

17. The method of claim 16 wherein the step of filtering and combining further comprises calculating a chunk size for each of the plurality of audio streams.

18. The method of claim 17 further comprising converting each chunk for each of the plurality of audio streams to a common format.

19. The method of claim 18 further comprising mixing each chunk together.

20. The method of claim 19 further comprising sending the mixed chunks to the output audio device as the single audio stream.

21. A system for producing a single audio stream from a plurality of audio streams of any audio format, the system comprising:
  a computer system, the computer system supporting at least one application program, the at least one application program producing the plurality of the audio streams, the computer system including:
    an audio device for outputting audio data from the computer system; and
    a mixer daemon, the mixer daemon emulating the audio device for maintaining transparency to the at least one application program by filtering and combining the plurality of audio streams to produce the single audio stream.

22. The system of claim 21 wherein the mixer daemon intercepts the plurality of audio streams from the at least one application program.

23. The system of claim 22 wherein the mixer daemon filters the plurality of audio streams by calculating a chunk size for each of the plurality of audio streams.

24. The system of claim 23 wherein the mixer daemon filters the plurality of audio streams by converting each chunk for each of the plurality of audio streams to a common format.

25. The system of claim 24 wherein the mixer daemon filters the plurality of audio streams by mixing each chunk together.

26. A computer readable medium containing program instructions for outputting a single audio stream from a plurality of audio streams provided by at least one application program running on a computer system with an audio device, the program instructions for:
  forming a server process in the computer system;
  emulating the audio device with the server process to allow any combination of audio stream formats for maintaining transparency to the at least one application program; and
  manipulating the plurality of audio streams with the server process to form the single audio stream.

27. A method for outputting a single audio stream from a plurality of audio streams provided by at least one application program running on a computer system with an audio device, the method comprising:
  forming a server process in the computer system, wherein the server process comprises a mixer daemon;
  emulating the audio device with the server process to allow any combination of audio stream formats; and
  manipulating the plurality of audio streams with the server process to form the single audio stream, including:
    calculating a chunk size for each of the plurality of audio streams, determining the chunk size based on a time slice of the plurality of audio streams and varying the chunk size with respect to time,
    choosing a set of parameters as a baseline, the baseline including a Pulse Code Modulation stereo audio with 16 bit samples,
    converting chunks of data to a common format for each of the plurality of audio streams,
    filtering and combining each chunk to be a common frequency,
    mixing the chunks together, and
    sending the mixed chunks to the audio device as the single audio stream.

28. A method for outputting a single audio stream from a plurality of audio streams provided by at least one application program running on a computer system with an audio device, the method comprising:
  forming a server process in the computer system, wherein the server process comprises a mixer daemon;
  emulating the audio device with the server process to allow any combination of audio stream formats; and
  manipulating the plurality of audio streams with the server process to form the single audio stream, including:
    calculating a chunk size and converting chunks of data to a common format for each of the plurality of audio streams,
    mixing the chunks together, and
    digitally combining the chunks and attenuating a volume associated with each chunk by an attenuation factor.

* * * * *

UNITED STATES PATENT AND TRADEMARK OFFICE
CERTIFICATE OF CORRECTION

PATENT NO.  : 5,890,017                                     Page 1 of 2
DATED       : March 30, 1999
INVENTOR(S) : Michael C. Tulkoff, et al.

It is certified that error appears in the above-identified patent and that said Letters Patent is hereby corrected as shown below:

On the title page, item [56], insert the following:
U.S. PATENT DOCUMENTS

| DOCUMENT NUMBER | DATE | NAME | CLASS | SUBCLASS |
|---|---|---|---|---|
| 5 4 8 7 0 6 7 | 01/23/96 | Matsushige | 370 | 85.7 |
| 5 1 9 2 9 9 9 | 03/09/93 | Graczyk et al | 358 | 85 |
| 5 5 0 8 9 4 0 | 04/16/96 | Rossmere et al | 364 | 514A |
| 5 5 2 6 4 0 8 | 06/11/96 | Yekutiely | 379 | 90 |
| 5 2 8 3 7 8 0 | 02/01/94 | Schuchman et al | 370 | 50 |
| 5 5 4 4 2 9 7 | 08/06/96 | Milne et al | 395 | 154 |
| 3 8 8 1 1 8 5 | 04/29/75 | Broline | 360 | 80 |
| 4 0 5 6 6 8 3 | 11/01/77 | Suehiro | 179 | 1 AT |
| 4 3 0 6 1 1 4 | 12/15/81 | Callahan | 179 | 1 B |
| 4 5 5 8 1 8 0 | 12/10/85 | Scordo | 179 | 18 BC |
| 4 9 9 3 0 7 3 | 02/12/91 | Sparks | 381 | 119 |
| 5 2 8 7 3 5 1 | 02/15/94 | Wall, Jr. | 370 | 77 |
| 5 4 5 0 1 4 0 | 12/12/95 | Washino | 348 | 722 |
| 5 4 7 3 3 6 3 | 12/05/95 | Ng et al | 348 | 15 |
| 5 4 9 6 1 7 8 | 03/05/96 | Back | 434 | 307 |
| 5 5 3 7 1 4 1 | 07/16/96 | Harper et al | 348 | 12 |
| 5 0 5 4 3 6 0 | 10/08/91 | Lisle et al | 84 | 645 |

UNITED STATES PATENT AND TRADEMARK OFFICE
CERTIFICATE OF CORRECTION

PATENT NO. : 5,890,017
DATED : March 30, 1999
INVENTOR(S) : Michael C. Tulkoff, et al.

It is certified that error appears in the above-identified patent and that said Letters Patent is hereby corrected as shown below:

OTHER ART (Including Author, Title, Date, Pertinent Pages, etc.)

| |
|---|
| IBM Technical Disclosure Bulletin, December 1993, Vol. 36 No. 12, "Software Control of Multimedia Audio Output Channels" |
| IBM Technical Disclosure Bulletin, September 1993, Vol. 36 No. 09B, "Software Control of Multimedia Device Interconnection" |
| IBM Technical Disclosure Bulletin, June 1986, Vol. 29 No. 1, "Analog Conference Bridge" |
| IBM Technical Disclosure Bulletin, January 1994, Vol. 37 No. 01, "Audio Mixer and Master Volume Control with Automatic Configuration" |

OTHER ART (Including Author, Title, Date, Pertinent Pages, etc.)

| |
|---|
| IBM Technical Disclosure Bulletin, July 1994, Vol. 37 No. 07, "Intelligent Packet Relay in Distributed Multimedia Systems" |

Signed and Sealed this

Twenty-sixth Day of September, 2000

Attest:

Q. TODD DICKINSON

*Attesting Officer*  *Director of Patents and Trademarks*